May 12, 1970   J. F. LYSTER ET AL   3,511,398
ROAD VEHICLES
Filed Jan. 10, 1968   6 Sheets-Sheet 4
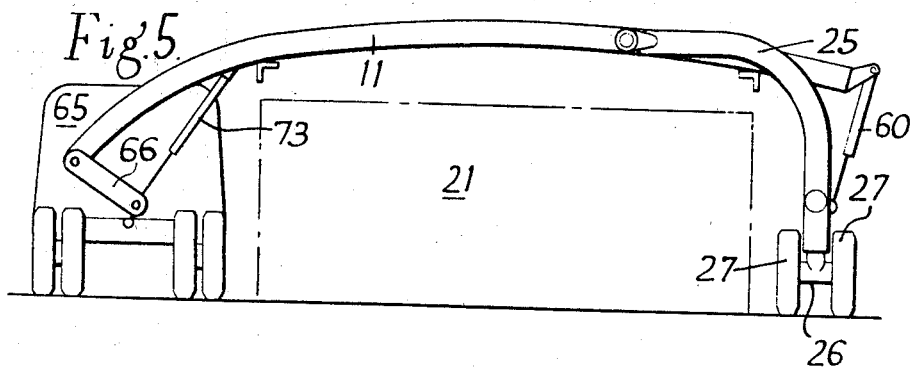
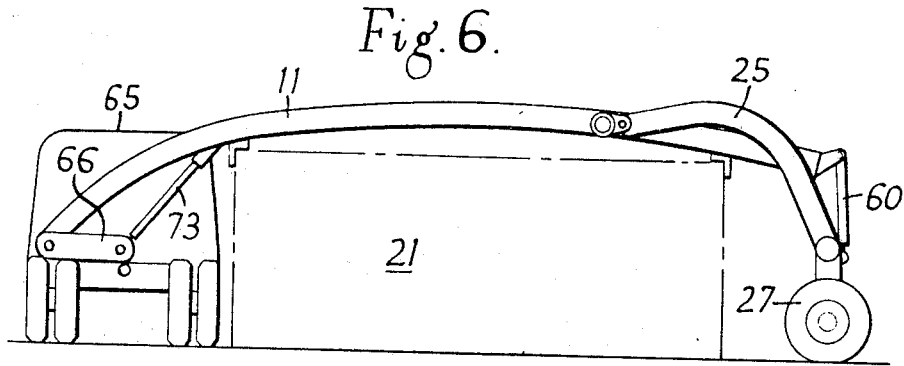
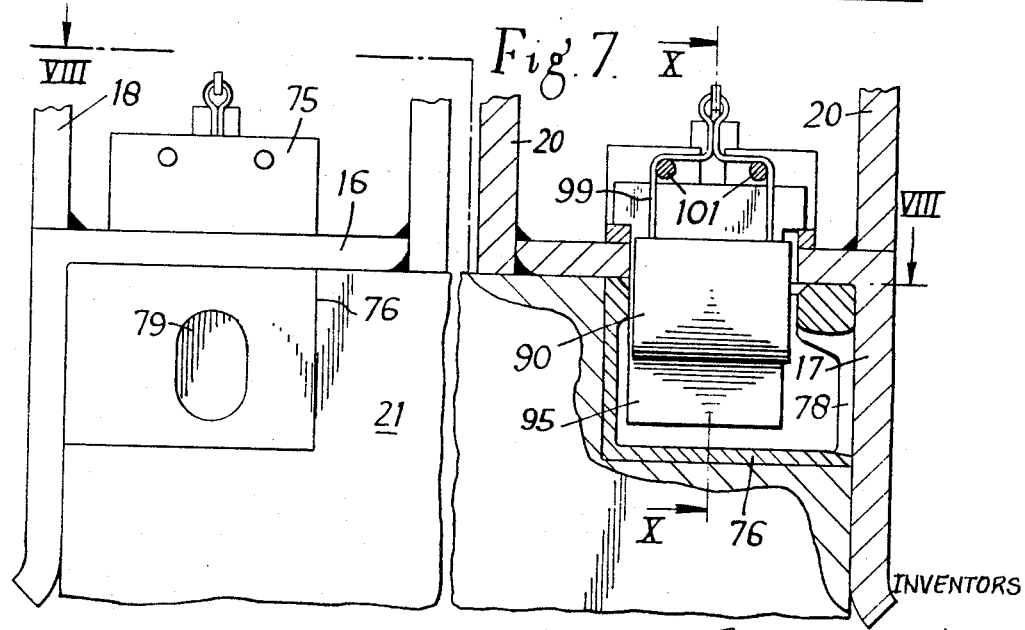
INVENTORS
John F. Lyster
Christopher S.J. Gunner
BY Dedio and Montgomery
ATTORNEYS May 12, 1970 J. F. LYSTER ET AL 3,511,398
ROAD VEHICLES
Filed Jan. 10, 1968 6 Sheets-Sheet 5
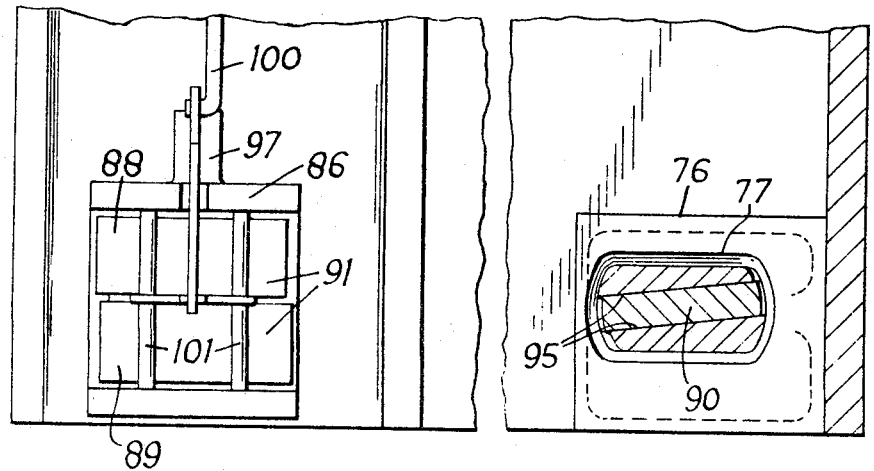
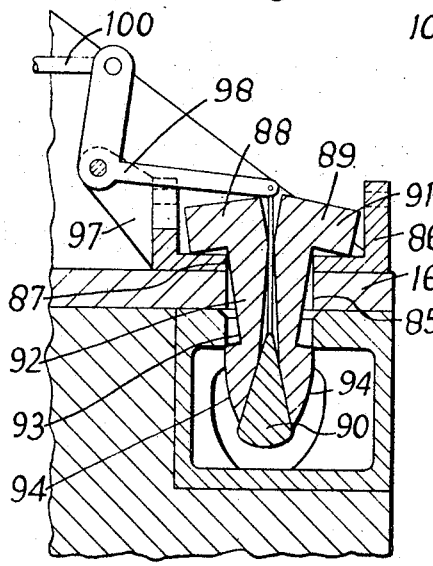
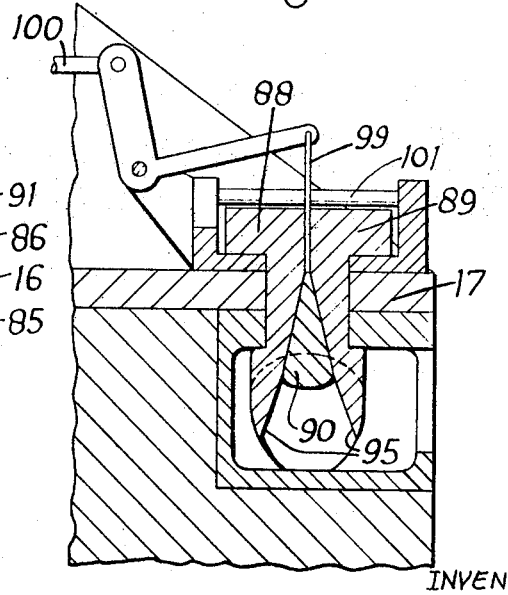
INVENTORS
John F. Lyster
Christopher S. J. Gunner
BY
De Lio and Montgomery
ATTORNEYS United States Patent Office 3,511,398
Patented May 12, 1970

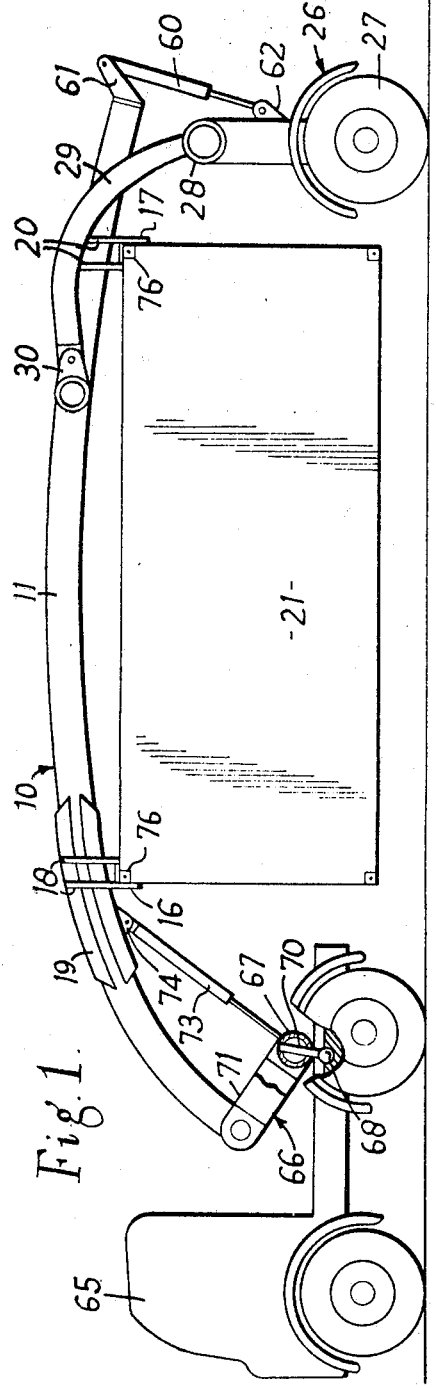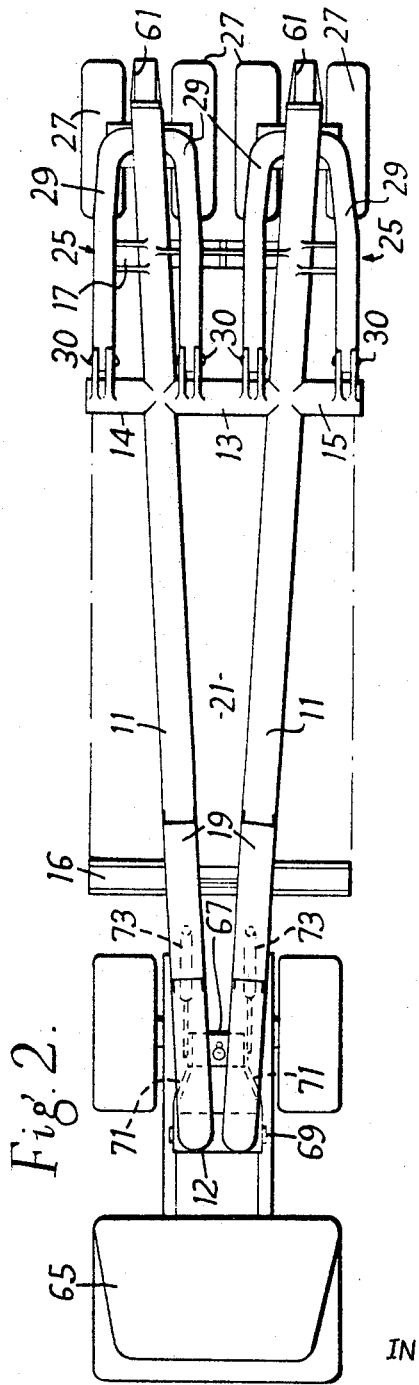

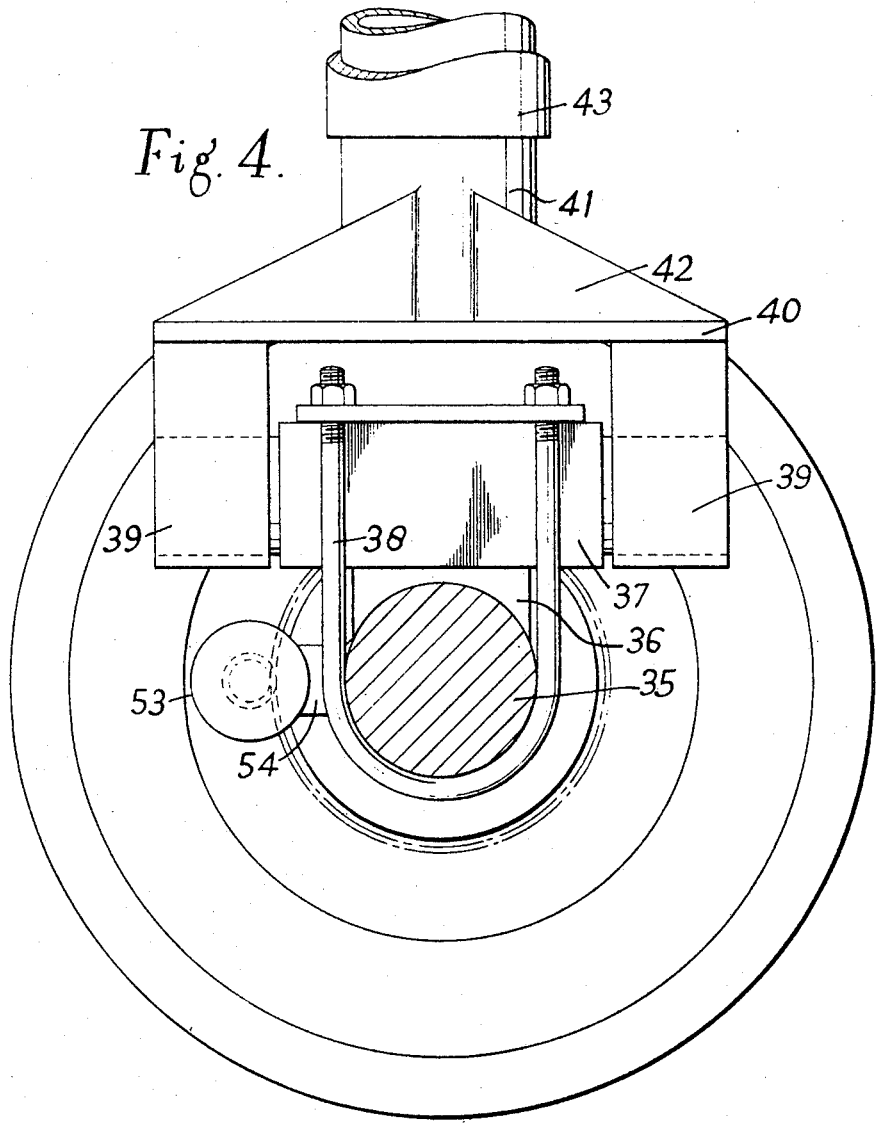

3,511,398
ROAD VEHICLES
John F. Lyster, Merstham, Surrey, and Christopher S. J. Gunner, Seaford, Sussex, England, assignors to Cow & Gate Limited
Filed Jan. 10, 1968, Ser. No. 696,748
Claims priority, application Great Britain, Jan. 13, 1967, 1,899/67
Int. Cl. B66f 9/00
U.S. Cl. 214—394   15 Claims

ABSTRACT OF THE DISCLOSURE

A road vehicle, for transporting containers, has a chassis arranged to straddle a container resting on the ground, locking means on the chassis expandible within corner castings on the container, and jacks for raising the chassis on its wheels so as to suspend a container secured to the chassis.

BACKGROUND OF THE INVENTION

The present invention relates to road vehicles for transporting one or more containers or other unit loads capable of being picked up and carried from above, and the invention is concerned more particularly, but not exclusively, to vehicles for transporting large containers, for example those known as I.S.O. (International Organisation for Standardisation) which currently are of 8 foot square cross-section and between 10 feet and 40 feet in length.

Large I.S.O. containers are now commonly being used for transporting assorted freight, the container being sealed at the point of departure and not unsealed until it reaches its destination. Such containers when fully loaded are very heavy and special facilities have been provided at terminals for loading and unloading the containers from vehicle platforms.

SUMMARY OF THE INVENTION

According to the invention there is provided a road vehicle for transporting at least one container or other unit load, comprising a chassis mounted on road wheels, the chassis being arranged to straddle a container resting on the ground, means for securing the container to the chassis, and lifting means operable to raise the chassis relative to the road wheels so as to suspend a container secured to the chassis.

The road vehicle according to the invention has the advantage that a container or other unit load can be loaded and unloaded from the vehicle without the use of separate lifting apparatus. In a case in which the chassis straddles the container longitudinally with respect to the vehicle, the overall width of the vehicle need not exceed the width of the container. Thus, if the width of the container is below the statutory limit for road vehicles, the loaded vehicle can be driven on the public highways without special clearance being obtained from the authorities.

The vehicle may be arranged to support a single large container extending longitudinally with respect to the vehicle, or two or more containers arranged end to end, or several small containers or other unit loads arranged in one or more rows extending longitudinally with respect to the vehicle. It is of course essential that each container or unit load is provided with appropriate fittings to enable it to be picked up and carried from above.

At least one side of the chassis is preferably open to permit relative transverse movement between the container and vehicle into the straddle position. The wheels of the vehicle may be adjustable into positions transverse with respect to the longitudinal axis of the vehicle and some of the wheels may be power driven to enable the vehicle to be moved transversely over a container on the ground.

The chassis is preferably pivotally connected to swing arm assemblies at opposite ends of the chassis, the swing arm assemblies being supported on the wheels and the lifting means being operable to pivot the swing arm assemblies relative to the chassis so as to raise and lower the chassis.

The lifting means at the opposite ends of the chassis of the vehicle may comprise mechanical or hydraulic jacks. In vehicles fitted with hydraulic jacks, the hydraulic circuits for the jacks preferably include gas cushions providing a spring suspension for the chassis and container. The jacks themselves may be supported on additional spring means.

The vehicle may be self-propelled, or may be in the form of a trailer adapted to be hitched to a road tractor. The vehicle according to the invention is however preferably a semi-trailer, the front end of which is mounted on and articulated to a road tractor.

According to the invention there is also provided a locking unit for use in securing, to an overhead chassis or frame, a container fitted with a hollow support member having an inlet opening, said locking unit comprising a base adapted to be mounted on the frame, the base having an opening therein, two clamp blocks projecting downwards through the opening, a wedge disposed between the clamp blocks, and means for moving the wedge into an engaged position in which the clamp blocks are forced apart by the wedge.

In a preferred arrangement of the locking unit, the opening in the base is substantially rectangular, the clamp blocks are arranged on opposite sides of the longitudinal centre line of the opening, and each clamp block has a head overlying one side of the opening in the base, a shank projecting through the opening, and a rail or lug on the lower end of the shank underlying the head, the opposing inner faces of the two heads being substantially parallel to said centre line and the opposing inner faces of the shanks being inclined relative to said centre line and adapted to co-operate with the wedge.

An articulated trailer-tractor vehicle according to the invention and fitted with a standard I.S.O. 8 ft. x 8 ft. x 20 ft. container will now be described, by way of example, with reference to the accompanying drawings, in which:

FIG. 1 is a side elevation view of the vehicle and container;

FIG. 2 is a plan view of the vehicle and container;

FIG. 4 is a view along the line IV—IV in FIG. 3;

FIGS. 5 and 6 illustrate one method of loading a container on the vehicle;

FIG. 7 is an elevation view of front and rear locking mechanism for attaching a container to the trailer, the rear locking mechanism being shown in longitudinal section;

FIG. 8 is a plan view taken along the line VIII—VIII in FIG. 7;

FIG. 9 is a transverse sectional view of one of the locking mechanisms of FIG. 7, the locking mechanism being disengaged;

FIG. 10 is a transverse sectional view of the locking mechanism in the engaged position, taken along the line X—X in FIG. 7.

Figure 3:
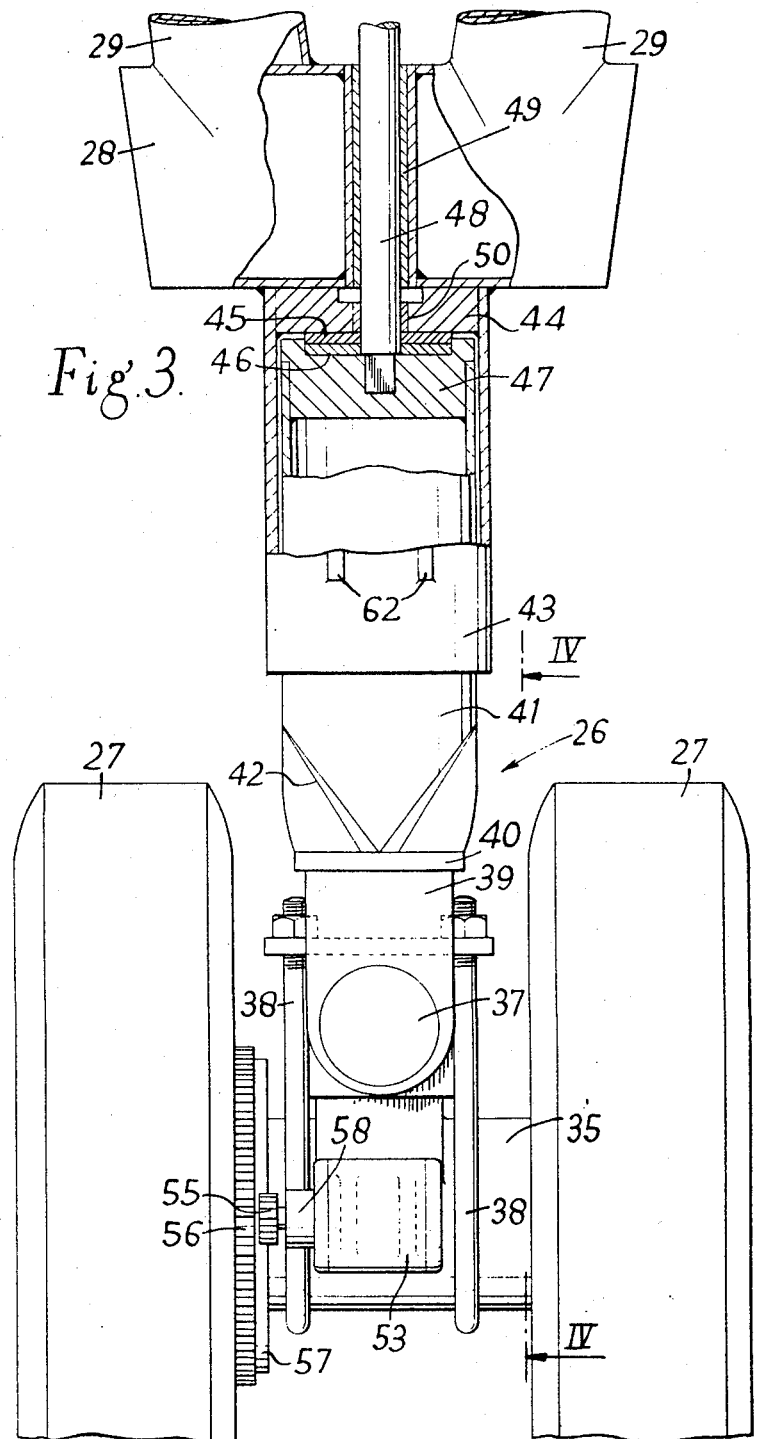
FIG. 3 is a part-sectional view of part of the rear of the vehicle.

As shown in FIGS. 1 and 2, the trailer has a chassis 10 of "wishbone" construction consisting of two tubular section beams 11 which are of arched form in side elevation with the concave side facing downwards, the two beams 11 being arranged alongside one another but diverging in the rearward direction. The front ends of the two beams 11 are arranged close together and welded to a transverse bolster 12, and the two beams 11 are also interconnected by a section of tube 13 extending transversely between the beams at a position spaced approximately one-third the length of the chassis from the rear end thereof. Two further sections of tube 14, 15 are welded to the beams 11, the tube section 14, 15 being aligned with the tube section 13 and projecting outwards on opposite sides of the chassis.

Front and rear transverse beams 16, 17 of angle section are secured to the underside of the chassis. The front beam 16 is welded to vertical plates 18 secured to reinforced sections 19 on the two beams 11, and the rear beam 17 is welded to vertical plates 20 secured to the beams 11. The two beams are arranged so that they can fit around the front and rear top edges of a container 21 to be transported by the vehicle.

The rear of the chassis is provided with two trailing swing arm assemblies 25 each fitted with a rear axle unit 26 having road wheels 27, the two swing arm assemblies being arranged alongside one another on opposite sides of the chassis. Each swing arm assembly comprises a transverse bolster 28 (FIG. 3) and two arched tubes 29 arranged on opposite sides of the associated beam 11, the front ends of the tubes 29 being pivotally mounted on lugs 30 secured on the tube sections 13, 14, 15 and the rear ends of the tubes 29 being welded to the bolster 28. The pivot axes of the two swing arm assemblies are colinear as shown in FIGS. 1 and 2, and the tubes 29 are spaced above the rear transverse beam 17.

Each rear axle unit 26 comprises an axle beam 35, the wheels 27 being rotatably mounted on the ends of the axle beam, a saddle 36 on the centre of the axle beam, a trunion shaft 37 having a square section centre portion secured by U-bolts 38 on the saddle 36, two trunion journals 39 depending from opposite ends of a platform 40, the ends of the shaft 37 being rotatably mounted in the journals 39, a tube 41 mounted on end on the platform 40, and gusset plates 42 rigidly securing the tube 41 in position on the platform. The tube 41 is a close rotational fit within a downwardly extending tube 43 on the bolster 28 of the associated swing arm assembly 25. A thrust pad 44 in the upper end of the tube 43 is fitted with a bearing 45 which engages a further bearing 46 on a thrust pad 47 secured in the upper end of tube 41. A shaft 48 extends downwards through bearing sleeves 49, 50 in the bolster 28 and thrust pad 44, and is keyed at its lower end in the thrust pad 47. The upper end of the shaft is drivably connected to a hydraulic or electric steering motor (not shown) mounted on the bolster 28. A hydraulic or electric driving motor 53 is mounted on a bracket 54 (FIG. 4) on the axle beam and provided with a pinion 55 for driving a ring gear 56 secured on the brake drum 57 of one of the road wheels 27. The pinion 55 is mounted on splines on the drive shaft of the motor and is axially movable under the control of an electric solenoid 58 into and out of engagement with the ring gear 56.

The axle beam 35 of each rear axle unit is thus free to pivot about the axis of the trunnion shaft 37 to enable the wheels to follow an uneven road surface, and the entire rear axle unit may be pivoted about the axis of the tube 43 on the associated swing arm assembly by turning the shaft 48 under the control of the steering motor in order to steer the rear of the vehicle around a corner. Operation of the steering motor may be controlled by a steering wheel in the tractor. Each rear axle unit may be turned by the shaft 48 into a position in which the wheels 27 are normal to the longitudinal axis of the trailer, the solenoid 58 energised to engage the pinion 55 and gear 56, and the motor 53 operated in order to move the rear of the trailer transversely.

The rear end of the chassis of the trailer is supported on the two axle units 26 by two hydraulic jacks 60 arranged on opposite sides of the rear end of the chassis.

As shown in FIG. 1 the cylinder of each jack 60 is pivotally mounted on a pin extending between two lugs 61 on the rear end of the beam 11 on the associated side of the vehicle and the plunger rod is pivotally mounted on a pin extending between two lugs 62 on the tube 43 of the swing arm assembly. Extension of the jacks 60 will thus cause the swing arm assemblies 25 to pivot downwards relative to the chassis and raise the rear end of the chassis.

The front end of the chassis of the trailer extends over a tractor 65 and is connected by a swing arm assembly 66 to a bolster 67 secured to a bi-planar articulating coupling, in this example a ball and socket coupling shown at 68 on the tractor. The bolster 12 on the front of the chassis comprises a tube sealed at its ends by circular plates and a shaft 69 secured in apertures in the centres of the two plates. The bolsters 67 comprises a tube sealed at its ends by circular plates fitted with outwardly projecting stub shafts (not shown) and a shaft 70 on the ball of the coupling 68 extends through and is rigidly secured in the tube of the bolster 67. The swing arm assembly 66 comprises two swing links 71 which extend downwardly and rearwardly at an angle of approximately 45°, their front ends being pivotally mounted on the ends of the shaft 69 on the bolster 12 and their rear ends being pivotally mounted on the stub shafts on the bolster 67. The axial length of the bolster 67 is shorter than that of the bolster 12 and the swing links 71 are cranked towards each other as shown in FIG. 2. The two links are interconnected by a metal plate (not shown) which extends across the gap between the two links and is welded thereto.

The front end of the chassis of the trailer is supported on the bolster 67 by two hydraulic jacks 73 on opposite sides of the chassis. The cylinder of each jack 73 is pivotally mounted on a pin extending between two lugs 74 on the reinforced section 19 on the beam 11 on the associated side of the chassis, and the plunger rod is pivotally mounted on the stub shaft on the associated side of the bolster 67.

The trailer is constructed such that, when the front and rear jacks are fully extended, there is sufficient clearance below the chassis to accommodate an 8 ft. x 8 ft. x 20 ft. container arranged lengthwise with respect to the fore-and-aft axis of the trailer.

To transport a container resting on the ground, the jacks are fully extended in order to raise the chassis to its highest position, and the vehicle is manoeuvered into a position in which the chassis extends lengthwise over the container. This can conveniently be done by positioning the chassis alongside the container, turning the tractor 50 and the two rear axle units 26 into positions at right angles to the fore-and-aft axis of the trailer, as shown in the FIG. 5, energising the solenoid 58 to engage the pinion 55 with the ring gear 56, and then driving the tractor 65 and the motor 53 so as to move the trailer sideways into a position in which it straddles the container longitudinally. The pinion 55 is then disengaged from the gear 56, the rear axle units 26 turned into alignment with the longitudinal axis of the trailer, and the jacks retracted to lower the chassis and engage the transverse beams 16, 17 against the top edges of the container as shown in FIG. 6. The container is then secured to the transverse beams, and the jacks subsequently extended to lift the frame and thereby suspend the container clear of the ground.

The hydraulic jacks may be fitted with means for locking the jacks in the extended position and thereby preventing the container being deposited on the ground in the event of failure of hydraulic pressure. Such locking means can conveniently be in the form of a hinge-mounted skeletal frame adapted to be secured around each plunger rod.

The container may be secured to the transverse beams 16, 17 by any suitable means, and FIGS. 7-10 illustrate one example of locking mechanism for this purpose.

In the arrangement shown in FIGS. 7-10, each end of the two transverse beams 16, 17 is fitted with a locking unit 75 adapted to engage a corner casting 76 fitted to the corresponding upper corner of the container. The corner castings 76 are shown in FIG. 1 but the locking units have been omitted from this figure. The corner castings are of known construction for use with lifting hooks and comprise a hollow box-shaped casing which is welded in position in a correspondingly shaped recess in a corner of the container so that the exposed walls of the casting are substantially flush with the walls of the container. The exposed horizontal wall of the corner casting has an inlet opening 77 and the exposed end and side walls have openings 78, 79 respectively. The inlet opening 77 is substantially rectangular with its major axis parallel to the longitudinal axis of the container.

The transverse beams 16, 17 are provided with openings 85 which are aligned with and similar in size to the inlet openings 77 in the four corner castings on the top of a container engaged with the transverse beams. Each locking unit comprises a support tray 86 mounted on the associated transverse beam, the base of the tray having an opening 87 similar in size to and aligned with the opening 85 in the end of the beam, two clamp blocks 88, 89 extending through the openings 87, 85 and a wedge 90 disposed between the two clamp blocks 88, 89. The two clamp blocks are arranged on opposite sides of the support tray and each clamp block has a head 91 which overlies the marginal portion of the tray along one side of the opening 87, and a shank 92 which extends downwards through the openings 87, 85 and is of a length to extend into the interior of a corner casting on a container engaged against the undersides of the transverse beams 16, 17. The lower portion of the shank 92 is provided with an outwardly projecting rail underlying the head 91 and co-operating therewith to form a slot 93 which extends the full length of the clamp block and has a width equal to the combined thickness of the base of the support tray, the horizontal flange of the transverse beam and the upper wall of the corner casting. The outer surfaces 94 of the lower ends of the two clamp blocks are chamfered as shown in FIG. 9 to facilitate entry of the clamp blocks through the inlet opening 77 of the corner casting. The opposing inner surfaces 95 of the two clamp blocks are inclined at a small angle relative to the fore-and-aft direction of the trailer as shown in the right hand side of FIG. 8, and the lower end portions of the two inner surfaces 95 diverge in a downwards direction so that the wedge 90 co-operates with the two surfaces 95 to force the clamp blocks apart when the wedge is forced upwards. The parting line between the heads 91 of the two clamp blocks is parallel to the longitudinal axis of the trailer, as shown on the left hand side of FIG. 8.

One side wall of the support tray 86 is provided with two spaced lugs 97 and a bell crank lever 98 is pivotally mounted on a pin extending between the two lugs. One arm of the lever 98 is pivotally connected to a link 99 attached to the wedge, and the other arm of the lever 98 is pivotally connected to a rod 100. The rods 100 of the two locking units on each transverse beam are connected to a common actuating mechanism (not shown) operable to force the wedges upwards between the two clamp blocks. Alternatively, the wedge of each locking unit may be individually actuated by independent mechanism.

When the wedges 90 are in the lower disengaged position shown in FIG. 9 the overall distance between the outer faces 94 of the clamp blocks is less than the width of the inlet opening 77 in the corner casting, so that the chassis of the trailer may be lowered on to a container with the clamp blocks projecting into the corner castings. When the wedges are then forced upwards into the position shown in FIG. 10, the clamp blocks are forced against the sides of the openings 87, 85, 77 in the support tray, transverse beam and the upper wall of the corner casting, the marginal portions of the support tray transverse beam and corner casting alongside these openings being accommodated within the slots 93 on the clamp blocks. Moreover, since the opposing inner surfaces 95 of the clamp blocks are inclined relative to the fore-and-aft axis of the trailer, upward movement of the wedge also forces the clamp blocks against the front and rear edges of the openings 87, 85, 77. The clamp blocks thus rigidly secure the container to the transverse beams on the trailer, and when the chassis of the trailer is raised by the jacks the weight of the container is supported on the lower walls of the slots 93 in the clamp blocks.

The wedges can be retained in the raised position by removable keep rods 101 mounted on the side walls of the support tray 86 and extending below horizontal portions of the link 99, as shown in the right hand side of FIG. 7.

A container fitted to the trailer may be quickly released by lowering the chassis to deposit the container on the ground, lowering the wedges of the locking units to disengage the clamp blocks from the upper walls of the corner castings, and then raising the chassis to withdraw the clamp blocks from the corner castings. The two clamp blocks in each locking unit may be urged by a spring (not shown) towards the disengaged position shown in FIG. 8.

The hydraulic circuits of the jacks are preferably connected to hydraulic accumulators to provide a spring suspension for the frame.

Figure 11:
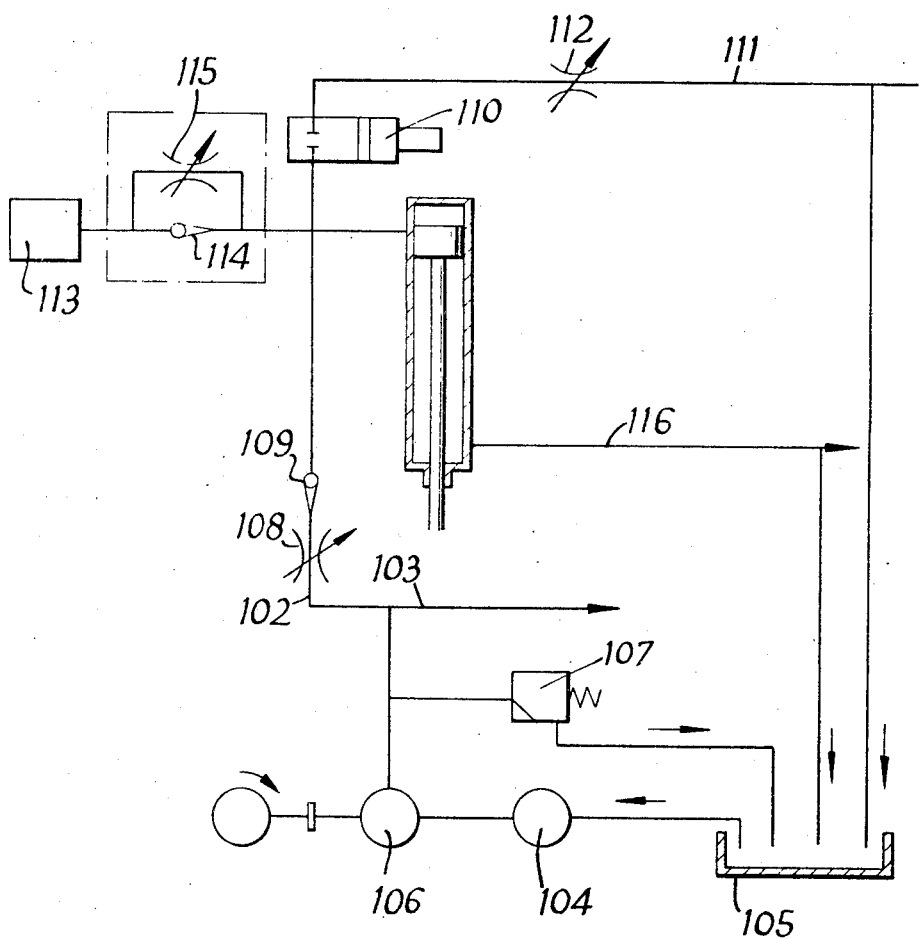
FIG. 11 shows the hydraulic circuit for one of the lifting jacks of the vehicle.

A suitable hydraulic circuit for each jack is shown in diagrammatic form in FIG. 11. This circuit comprises a feed line 102 connected to a common supply line 103 for the four jacks. The supply line 103 is fed through a filter 104 from a reservoir 105 by a motor driven pump 106, and a relief valve 107 is arranged to bleed the line 103 in the event of over-pressurisation. Each feed line 102 is connected through an adjustable flow restricting valve 108 and a non-return valve 109 to the upper end of the cylinder of the jack. The upper end of the cylinder is also connected through a manual control valve 110 to a return line 111 connected to the reservoir through a flow restricting valve 112, the return line 111 being common to the jacks. The upper end of the cylinder is also connected to a hydraulic accumulator 113 through a non-return valve 114 and a flow restricting valve 115 connected in parallel with the non-return valve 114. The accumulator contains gas which is subject to the varying pressure of liquid in the accumulator. Such an accumulator is well known and has therefore not been illustrated. The lower end of the cylinder is connected to a further return line 116 common to all the jacks.

To extend the jack, the control valve 110 is closed and the pump 106 is driven to force oil under pressure into the supply line 103. Oil then flows through the flow restricting valve 108 and the non-return valve 109 into the upper end of the cylinder, forcing the piston downwards towards the bottom of the cylinder. Oil displaced from the lower end of the cylinder flows to the reservoir through return line 116.

To retract the jack, the control valve 110 is opened to allow the oil in the upper end of the cylinder to return to the reservoir through line 111 and the flow restricting valve 112.

If a shock load is transmitted to any of the jacks when in the extending position, the resulting pressure in the cylinder displaces oil through the non-return valve 114 to the accumulator 113. When the shock load is removed, oil in the accumulator returns to the cylinder through the flow restricting valve 115 to extend the jack to its original position. The rate of recovery of the jack to its original position is dictated by the setting of the valve 115.

In a modified construction of the vehicle shown in the drawings, the two beams 11 are arranged parallel to one another and at least one of the transverse beams 16, 17 is adapted to be secured at different positions along the beams 11 to accommodate containers of different lengths.

In a further modified construction of the vehicle, the two trailing swing arm assemblies 25 are adapted to swing outwards away from each other to allow the trailer to be reversed over a container resting on the ground. For this purpose the front end of the outer tube 29 of each swing arm assembly 25 may be connected to the chassis by a ball joint and the front end of the inner tube 29 pivotally connected to a slide block movable along arcuate rails having a radial centre concentric with the ball joint, the pivot axis of the inner tube extending through the centre of the ball joint.

We claim:

1. A road vehicle for transporting a container, comprising a chassis having overhead longitudinal beams, lifting means at opposite ends of the chassis and supporting the chassis on road wheels, means for adjusting said wheels into positions transverse with respect to the longitudinal axis of the vehicle to permit transverse movement of the vehicle, said lifting means being operable to raise the chassis to a height which permits the vehicle to be maneuvered into a position in which the chassis straddles the container on the ground and then to lower the chassis onto the container, so that at least part of the weight of the chassis is supported on the container, at least one side of the chassis being open to permit relative transverse movement between the container and vehicle into the straddle position, and securing means operable to rigidly secure the container to the chassis when engaged therewith, the lifting means being subsequently operable to raise the chassis and container above the ground.

2. A road vehicle as claimed in claim 1, wherein the chassis is pivotally connected to swing arm assemblies at opposite ends of the chassis, the lifting means being operable to pivot the swing arm assemblies relative to the chassis so as to raise and lower the chassis.

3. A road vehicle as claimed in claim 2, wherein the rear of the chassis is supported on two swing arm assemblies pivotally connected to the chassis at opposite sides thereof, the swing arm assemblies having rear axle units fitted with wheels.

4. A road vehicle as claimed in claim 3, wherein the rear axle units are steerable into positions in which the road wheels are transverse with respect to the longitudinal axis of the vehicle.

5. A road vehicle as claimed in claim 4, wherein at least one of the rear axle units is provided with a motor and means for drivably connecting the motor to a wheel of the axle unit.

6. A road vehicle as claimed in claim 2, wherein the chassis comprises the frame of a semi-trailer adapted to be articulated to a tractor.

7. A road vehicle as claimed in claim 6, wherein the front of the chassis is supported on a swing arm assembly adapted to be mounted on the tractor.

8. A road vehicle as claimed in claim 7, wherein the chassis comprises curved longitudinal beams having the concave side facing downwards, and transverse beams secured to the longitudinal beams, the means for securing the container to the chassis being mounted on the transverse beams.

9. A road vehicle as claimed in claim 8, wherein the transverse beams are arranged to engage around the front and rear top edges of a container.

10. A road vehicle as claimed in claim 1, wherein the lifting means comprise hydraulic jacks and the hydraulic circuits for the jacks include gas cushions providing a spring suspension for the chassis and container.

11. A road vehicle as claimed in claim 1 and having a container suspended from the chassis of the vehicle, including socket members in the top of the container, said socket members having inlet openings in the top walls thereof, support beams on the chassis overlying said socket members, the support beams having apertures aligned with said inlet openings, individual clamp blocks extending through said apertures and aligned inlet openings, and wedges forcing the clamp blocks into locking engagement with both the support beams on the chassis and the socket members on the container.

12. A road vehicle as claimed in claim 11, wherein two clamp blocks extend through each of said apertures in the support beams, and a wedge is disposed between the two clamp blocks, the wedge being displaceable between an engaged position in which the clamp blocks are forced apart by the wedge into locking engagement with both the support beam and the socket member, and a disengaged position in which the clamp blocks are removable from the socket member upon lifting the chassis with the container on the ground.

13. A road vehicle as claimed in claim 12, wherein each of the apertures in the support beams and the aligned inlet opening in the socket member is substantially rectangular, the two clamp blocks have heads supported on the support beam on opposite sides of the inlet opening and shanks which project through said aperture and inlet opening and extend substantially the full length thereof, the opposing inner surfaces of the heads are substantially parallel to the longitudinal center line of the inlet opening and the opposing inner surfaces of the shanks are inclined relative to said center line, whereby movement of the wedge into the engaged position between the shanks of the clamp blocks forces the clamp blocks into clamping engagement with the sides and ends of both the aperture in the support beam and the inlet opening.

14. A road vehicle as claimed in claim 12, wherein each clamp block is provided with a slot arranged to accommodate the marginal portions of the support beam and socket member along the associated sides of said aperture in the support beam and the aligned inlet opening when in locking engagement with the support beam and socket member.

15. A road vehicle as claimed in claim 1 and having a container suspended from the chassis of the vehicle, including hollow socket members in the top of the container, said socket members having rectangular inlet openings in the upper walls thereof, support beams on the chassis overlying said socket members, the support beams having rectangular apertures aligned with said inlet openings, two individual clamp blocks extending through each of said apertures and the aligned inlet opening and arranged on opposite sides of the longitudinal center line of the aperture and inlet opening, and a wedge disposed between the two clamp blocks, each clamp block having a head overlying the support beam and a flange underlying the upper walls of the socket member, whereby the weight of the container is transmitted through the clamp blocks to the support beams, the opposing inner faces of the heads on the clamp blocks being substantially parallel to said center line and in sliding contact with one another, the opposing inner faces of the lower portions of the clamp blocks being inclined relative to said center line and cooperating with the wedge to force the clamp blocks into locking engagement with the side edges of said aperture and the inlet opening and to displace the clamp blocks longitudinally within said aperture and inlet opening into clamping engagement with the ends thereof.

References Cited

UNITED STATES PATENTS

| | | | |
|---|---|---|---|
| 314,243 | 3/1885 | Heathcote | 294—89 |
| 956,938 | 5/1910 | Ciardelli | 294—89 |
| 2,376,296 | 5/1945 | Walter | 214—394 |
| 3,039,633 | 6/1962 | Mindrum et al. | 214—390 |
| 3,043,411 | 7/1962 | Wyrough | 294—89 XR |
| 3,197,229 | 7/1965 | Houlton | 214—394 XR |
| 3,015,407 | 1/1962 | Fesmire et al. | |
| 3,348,711 | 10/1967 | Gove | 214—392 |

ALBERT J. MAKAY, Primary Examiner

U.S. Cl. X.R.

294—67, 89